(12) United States Patent
Jain et al.

(10) Patent No.: US 12,051,403 B2
(45) Date of Patent: Jul. 30, 2024

(54) SERVER SUPPORTED RECOGNITION OF WAKE PHRASES

(71) Applicant: SoundHound, Inc.

(72) Inventors: Newton Jain, Toronto (CA); Sameer Syed Zaheer, Mississauga (CA)

(73) Assignee: SoundHound AI IP, LLC., Santa Clara, CA (US)

( * ) Notice: Subject to any disclaimer, the term of this patent is extended or adjusted under 35 U.S.C. 154(b) by 0 days.

(21) Appl. No.: 17/584,780

(22) Filed: Jan. 26, 2022

(65) Prior Publication Data

US 2022/0148572 A1    May 12, 2022

Related U.S. Application Data

(63) Continuation of application No. 16/541,995, filed on Aug. 15, 2019, now abandoned.

(51) Int. Cl.
*G10L 15/06*     (2013.01)
*G06F 8/41*      (2018.01)
*G10L 15/08*     (2006.01)
*G10L 15/16*     (2006.01)

(52) U.S. Cl.
CPC .............. *G10L 15/063* (2013.01); *G06F 8/41* (2013.01); *G10L 15/16* (2013.01); *G10L 2015/088* (2013.01)

(58) Field of Classification Search
CPC . G10L 15/063; G10L 15/16; G10L 2015/088; G06F 8/41
See application file for complete search history.

(56) References Cited

U.S. PATENT DOCUMENTS

| | | | |
|---|---|---|---|
| 9,373,321 B2 | 6/2016 | Bapat et al. | |
| 9,443,517 B1* | 9/2016 | Foerster | .................. G10L 15/08 |
| 9,600,231 B1* | 3/2017 | Sun | .......... G10L 15/14 |
| 9,640,194 B1* | 5/2017 | Nemala | ............... G10L 21/0232 |
| 9,886,954 B1 | 2/2018 | Meacham | |
| 10,446,153 B2 | 10/2019 | Sharifi | |

(Continued)

FOREIGN PATENT DOCUMENTS

CN    106098059 A    11/2016
CN    107134279 A    9/2017

(Continued)

OTHER PUBLICATIONS

Li et al., "Adversarial Music: Real World Audio Adversary Against Wake-word Detection System", 2018, IEEE International Conference on Acoustics (Year: 2018).*

(Continued)

*Primary Examiner* — Bhavesh M Mehta
*Assistant Examiner* — Darioush Agahi
(74) *Attorney, Agent, or Firm* — Platinum Intellectual Property PC (57) ABSTRACT

A server supports multiple virtual assistants. It receives requests that include wake phrase audio and an identification of the source of the request, such as a virtual assistant device. Based on the identification, the server searches a database for a wake phrase detector appropriate for the identified source. The server then applies the wake phrase detector to the received wake phrase audio. If the wake phrase audio triggers the wake phrase detector, the server provides an appropriate response to the source.

12 Claims, 8 Drawing Sheets

(56) References Cited

U.S. PATENT DOCUMENTS

| | | | |
|---|---|---|---|
| 2014/0012586 A1 | 1/2014 | Rubin et al. | |
| 2018/0166078 A1 | 6/2018 | Sharifi | |
| 2018/0233150 A1* | 8/2018 | Gruenstein | G10L 15/30 |
| 2019/0027138 A1 | 1/2019 | Wang | |
| 2019/0206395 A1* | 7/2019 | Aoki | G10L 15/30 |
| 2019/0251960 A1* | 8/2019 | Maker | G10L 21/0232 |
| 2019/0287526 A1* | 9/2019 | Ren | G10L 15/22 |
| 2019/0364375 A1* | 11/2019 | Soto | G10L 15/22 |
| 2020/0090646 A1 | 3/2020 | Smith | |
| 2020/0312317 A1* | 10/2020 | Kothari | G06F 9/5027 |
| 2020/0349925 A1* | 11/2020 | Shahid | G10L 15/08 |
| 2020/0410983 A1 | 12/2020 | Mohajer | |
| 2021/0020162 A1* | 1/2021 | Griffin | G10L 15/063 |
| 2021/0043190 A1* | 2/2021 | Wang | G06N 3/045 |
| 2021/0316682 A1* | 10/2021 | Broy | B60R 25/257 |
| 2022/0093104 A1* | 3/2022 | Sharifi | H04L 67/568 |

FOREIGN PATENT DOCUMENTS

| | | | | |
|---|---|---|---|---|
| CN | 109147779 A | | 1/2019 | |
| CN | 109448725 A | * | 3/2019 | G10L 15/22 |
| CN | 109448725 A | | 3/2019 | |
| WO | 2020005202 A1 | | 1/2020 | |

OTHER PUBLICATIONS

CN109448725A_MT (Year: 2019).*

Chen, Guoguo, et al., "Small-footprint keyword spotting using deep neural networks". IEEE International Conference on Acoustics, Speech and Signal Processing (ICASSP) May 4, 2014. pp. 4087-4091.

"Frequently Asked Questions (FAQ)—CMUSphinx Open Source Speech Recognition". CMUSphinx. https://cmusphinx.github.io/wiki/faq/#qhow_to_implement_hot_word_listening. (accesed Jan. 15, 2019). 5 pages.

Erhopf et al., "Create a custom wake word by using the Speech service". Azure Cognitive Services. https://docs.microsoft.com/en-us/azure/cognitive-services/speech-service/speech-devices-sdk-create-kws. (accessed Jan. 15, 2019) 5 pages.

Kepuska, Veton. "Wake-Up-Word Speech Recognition". IntechOpen. https://www.intechopen.com/books/speech-technologies/wake-up-word-speech-recognition. (published Jun. 13, 2011)(accessed Jan. 15, 2019) 34 pages.

"Voice Activation—Windows drivers" Microsoft Docs. https://docs.microsoft.com/en-us/windows-hardware/drivers/audio/voice-activation. (published Dec. 20, 2018) (accessed Jan. 15, 2019) 17 pages.

"MyCortana download" SourceForge.net. https://sourceforge.net/projects/mycortana/. (accessed Jan. 15, 2019) 2 pages.

Shan, Changhao, et al. "Attention-based End-to-End Models for Small-Footprint Keyword Spotting". Mar. 29, 2018. 5 pages.

"Snowboy, a Customizable Hotword Detection Engine". KITT.AI. https://snowboy.kitt,ai. 20 pages.

Yao, Xuchen and Chen, Guoguo. "Developing Your Own Wake Word Engine Just Like "Alexa" and "OK Google"". KITT.AI. 27 pages.

"Azure-docs". GitHub. https://github.com/MicrosoftDocs/azure-docs/blob/master/articles/cognitive-services/Speech-Service/speech-devices-sdk-create-kws.md. (accessed Jan. 15, 2019) 4 pages.

"Getting Started Guide". Clarifai Developer. https://clarifai.com/developer/guide/. (accessed Jan. 15, 2019) 63 pages.

"Your home.mycroft.ai account and Pairing your Device(s)". MYCROFT.AI. https://mycroft.ai/documentation/home-mycroft-ai-pairing/#changing-your-wake-word (accessed Mar. 18, 2019) 10 pages.

First office action with search report issued by China Patent Office for the counterpart Chinese application No. 2020101581159, dated Mar. 4, 2024.

* cited by examiner

SERVER SUPPORTED RECOGNITION OF WAKE PHRASES

CROSS-REFERENCE TO RELATED APPLICATIONS

This application is a continuation of U.S. Ser. No. 16/541,995 filed Aug. 15, 2019 and entitled "CUSTOM WAKE PHRASE TRAINING", the entire contents of which are incorporated herein by reference.

FIELD

The present disclosure relates to systems and methods for providing custom wake phrase training, and more particularly, providing systems and methods for automatically generating an executable from the training for deployment on a device to recognize the custom wake phrase.

BACKGROUND

Wake phrase recognition generally involves spotting the occurrence of a particular spoken wake phrase in a continuous and potentially noisy audio signal, while ignoring all other words, phrases, sounds, noises and other acoustic events in the audio signal. For example, a user may utilize a wake word or phrase to voice a command to control the operation of a device such as a mobile device, an appliance, a car, a robot or other device. Generally, natural language processing is used to understand and act upon the speech input commands associated with the wake phrase. For example, speech recognition can be used to recognize the input audio as having corresponding text such that the text can then be analyzed to determine a specific command to be performed on the device.

In some cases, a developer has a proprietary device design (e.g. a car with "smart" capabilities) and wants to create a custom wake phrase that is associated with their brand and easily spotted by their smart devices. However, it is not feasible for providers of speech enabled virtual assistant platforms to manually customize a wake phrase for each developer's device design. Additionally, such manual customization, even if implemented, can also lead to inaccuracies in the custom wake phrase recognition in the virtual assistant device, which is generally unacceptable by a user. Instead, the developer is forced to utilize a pre-defined custom wake phrase provided by the platform, e.g. "OK ALEXA".

Accordingly, there exists a need to obviate or mitigate at least some of the above-mentioned disadvantages of existing systems and methods for custom wake phrase training and spotting. Notably, there is a need for an automated process and system of training custom wake phrase recognition for use on a speech enabled virtual assistant device to recognize developer-defined custom wake phrases. Embodiments of the present disclosure are directed to this and other considerations.

SUMMARY

Disclosed embodiments provide systems and methods for providing custom wake phrase training for a computer-implemented model for subsequently spotting the custom wake phrase when deployed on a voice enabled computing device such as a natural language controlled virtual assistant device.

In one aspect, there is provided a computing system for training custom phrase spotter executables for virtual assistants, the system comprising a processor and a memory in communication with the processor, the memory storing instructions that, when executed by the processor, configure the computing system to: receive a request for training a custom phrase spotter executable and an identification of a specific virtual assistant; responsive to receiving the request, receive: one or more positive audio samples corresponding to spoken audio of a custom wake phrase; train, using the positive audio samples, a model for the custom wake phrase audio; and compile the executable, including the model, such that, when deployed on the specific virtual assistant as identified by the identification, the executable recognizes the custom wake phrase.

In another aspect, there is provided a computer implemented method for training a custom phrase spotter executable, the method comprising: receiving a request for training a custom phrase spotter executable; receiving one or more positive audio samples corresponding to spoken audio of a custom wake phrase; training, using the positive audio samples, a model for the custom wake phrase; and compiling the executable, including the model, such that, when deployed for a virtual assistant, the executable recognizes the custom wake phrase.

In yet another aspect, there is provided a non-transitory computer readable medium storing code for a software development kit (SDK) for training a custom phrase spotter executable for a virtual assistant, the code is executable by a processor and that, when executed by the processor, causes the SDK to: receive a request for training a custom phrase spotter executable; receive one or more positive audio samples corresponding to spoken audio of a custom wake phrase; train, using the positive audio samples, a model for the custom phrase spotter executable; and compile the phrase spotter executable, including the model, such that, when deployed on the virtual assistant, the executable recognizes the custom wake phrase.

In yet another aspect, there is provided a computing system for training custom phrase spotter executables for virtual assistants, the system comprising a processor and a memory in communication with the processor, the memory storing instructions that, when executed by the processor, configure the computing system to: receive a request for training a custom phrase spotter executable and an identification of a specific virtual assistant; responsive to receiving the request, receive: text corresponding to the custom wake phrase; search within a corpus of audio samples, stored on a database of the computing system, for one or more stored positive audio samples corresponding to the text; and train, using the positive audio samples, a model for the custom wake phrase audio; and compile the executable, including the model, such that, when deployed on the specific virtual assistant as identified by the identification, the executable recognizes the custom wake phrase.

These and other aspects will be apparent including computer program products that store instructions in a non-transitory manner (e.g. in a storage device) that, when executed by a computing device, configure the device to perform operations as described herein.

Further features of the disclosed systems and methods and the advantages offered thereby, are explained in greater detail hereinafter with reference to specific embodiments illustrated in the accompanying drawings, wherein like elements are indicated be like reference numbers and designators.

BRIEF DESCRIPTION OF THE DRAWINGS

Reference is made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

While references to "an embodiment" are used herein, nothing should be implied or understood that features of one embodiment cannot be used or combined with features of another embodiment unless otherwise stated. The various systems, methods and devices shown and described herein may be used together unless otherwise stated.

DETAILED DESCRIPTION

Generally, in at least some embodiments, the present disclosure is directed to systems and methods for allowing customization of wake phrases for recognition and control of virtual assistant computing devices by training of computerized models using input positive and/or negative audio and/or text samples to improve accuracy of the training.

By way of background, virtual assistant computing devices are passive listening devices that are configured to understand natural language and are pre-configured to "wake up" or activate upon hearing their name such as "Hey Siri", "OK Google", or "Alexa". However, as discussed herein, there is a need to train and automatically configure virtual assistants to recognize custom wake phrases.

Figure 1A:
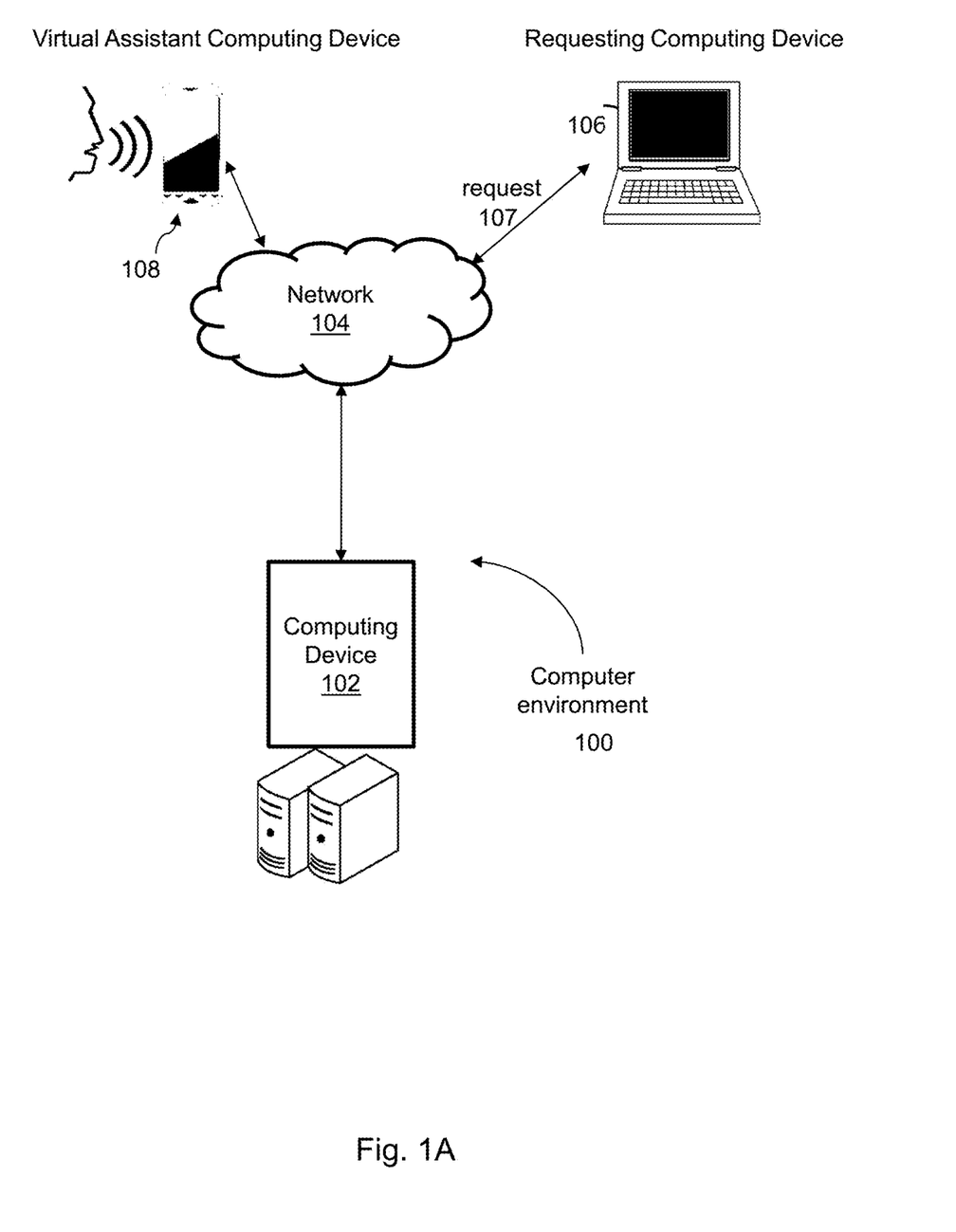
FIG. 1A is a block diagram illustrating portions of a representative computer environment, in accordance with one embodiment.
Figure 1B:
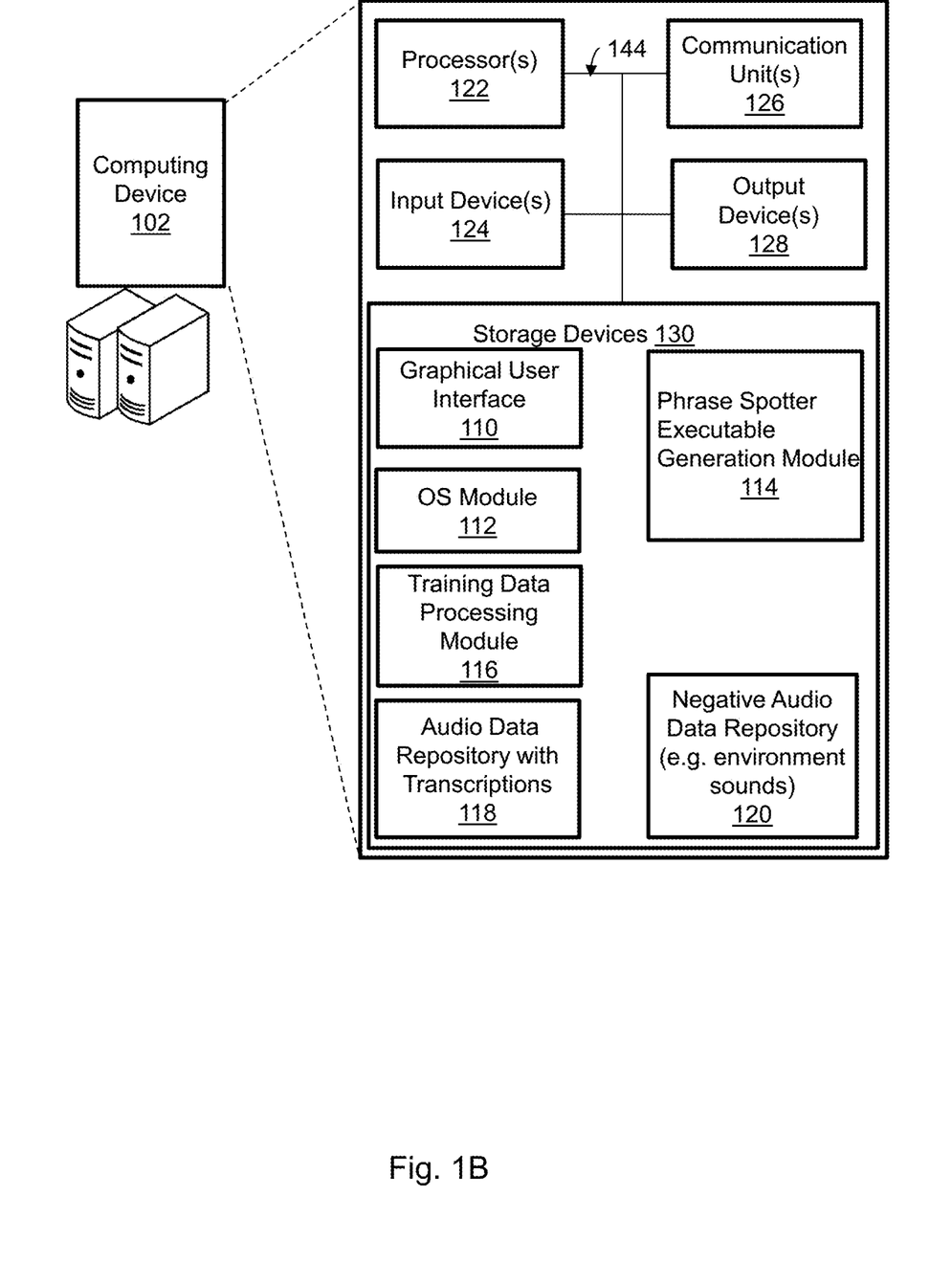
FIG. 1B illustrates details of an example computing device in the computer environment of FIG. 1A, in accordance with one embodiment.

In accordance with one embodiment, FIG. 1A illustrates a block diagram of a high-level architecture of a representative computer environment 100. The computer environment 100 comprises an example computing device 102 communicating with a network 104 and configured to dynamically train a computerized model for a phrase spotter executable operable for spotting a custom wake phrase as selected by a developer of a requesting computing device 106. The phrase spotter executable generated by the computing device 102 is for deployment on a voice-enabled virtual assistant computing device 108, in accordance with one or more aspects of the presented disclosure. Simplified component details of computing device 102 are illustrated and enlarged in FIG. 1B. Referring to FIGS. 1A and 1B, computing device 102 is communicating using one or more communication networks 104 with one or more other requesting computing devices 106. Computing device 102 receives respective request data 107 for custom wake phrase training including custom wake phrase particulars (e.g. in audio and/or text format) from the requesting computing device 106. In response, computing device 102 is configured to generate and output a respective phrase spotter executable to the requesting computing device 106 and/or a virtual assistant computing device 108 for subsequent deployment of the phrase spotter executable (e.g. see 308 in FIG. 3) on the virtual assistant computing device 108.

Referring again to FIGS. 1A and 1B, a particular request 107 may include a request for wake phrase customization and developer-provided details for the custom wake phrase (e.g. see input data 214 in FIG. 2), which can comprise audio and/or text data relating to positive and/or negative samples for use in training of the computerized model for wake phrase recognition. The details can be provided via a developer interface on the requesting computing device 106 displayed in response to the initiation of the request 107. Computing device 102 may further comprise one or more servers.

Other examples of the computing device 102 is a single computer, cloud computing services, a laptop computer, a desktop computer, a touch computing device or another type of computing device. In the example of FIG. 1A, the requesting computing device 106 is a laptop computer but may also be any computing device such as a cell phone, a desktop computer, or another type of computing device comprising at least a processor, a memory and a communication interface capable of communicating custom wake phrase requests (e.g. via a graphical interface) and receiving responses from computing device 102. Further, in the example embodiment of FIG. 1A, virtual assistant computing device 108 is a cell phone but may be any voice enabled computing device capable of voice interaction and control of its computer services and/or one or more associated smart devices. Example existing virtual assistant computing devices 108 include mobile phones, automobiles, smart speakers, appliances, kiosks, vending machines, and helper robots.

Computing device 102, requesting computing device 106 and virtual assistant computing device 108 are coupled for communication to one another via network 104, which may be a wide area network (WAN) such as the Internet. Additional networks may also be coupled to the WAN of network 104 such as a wireless network and/or a local area network (LAN) between the WAN and computing device 102 or between the WAN and any of requesting computing devices 106 and 108.

FIG. 1B shows example computer components of device 102, in accordance with one or more aspects of the present disclosure, for example, to provide a system and perform a method to train a model for a custom wake phrase spotter executable, which is operable to spot spoken instances of the custom wake phrase (e.g. once the executable is deployed on device 108), as selected by a developer of the requesting computing device 106 of FIG. 1A.

Computing device 102 comprises one or more processors 122, one or more input devices 124, one or more communication units 126 and one or more output devices 128. Computing device 102 also comprises one or more storage devices 130 storing one or more computer modules such as graphical interface 110, operating system module 112, phrase spotter executable generation module 114, training data processing module 116, audio data repository 118 (e.g.

a corpus of audio samples labelled with their associated transcriptions) and negative audio data repository 120 (e.g. a corpus of negative audio data such as spoken phrases that are similar but different from custom wake phrase audio data, background noise, environmental sounds, non-speech music, etc.).

Communication channel 144 may couple each of the components 122, 124, 126, 128, and 130 (and the computer modules contained therein), for inter-component communications. In some examples, communications channels 144 may include a system bus, a network connection, and inter-process communication data structure, or any other method for communicating data.

Processor(s) 122 may implement functionality and/or execute computer instructions within computing device 102. For example, processors 122 may be configured to receive instructions and/or data from storage devices 130 to execute the functionality of the modules 110, 112, 114, 116, 118, and 120 shown in FIG. 1B.

One or more communication units 126 are operable to allow communications with external computing devices including requesting computing device 106 and virtual assistant computing device 108 via one or more networks 104 by transmitting and/or receiving network signals on the one or more networks. The communication units 126 may include various antennae and/or network interface cards, etc. for wireless and/or wired communications with external computing devices and network 104.

Input devices 124 and output devices 128 may include any of one or more buttons, switches, pointing devices, one or more cameras, a keyboard, a pointing device, a microphone, one or more sensors (e.g., biometric, etc.), a speaker, a bell, one or more lights, a display screen (which may be a touchscreen device providing I/O capabilities), etc. One or more of same may be coupled via a universal serial bus (USB), Bluetooth or other communication units (e.g., 126). That is, input 124 and output 128 devices may be on device 102 or coupled thereto via wired or wireless communication.

Figure 2:
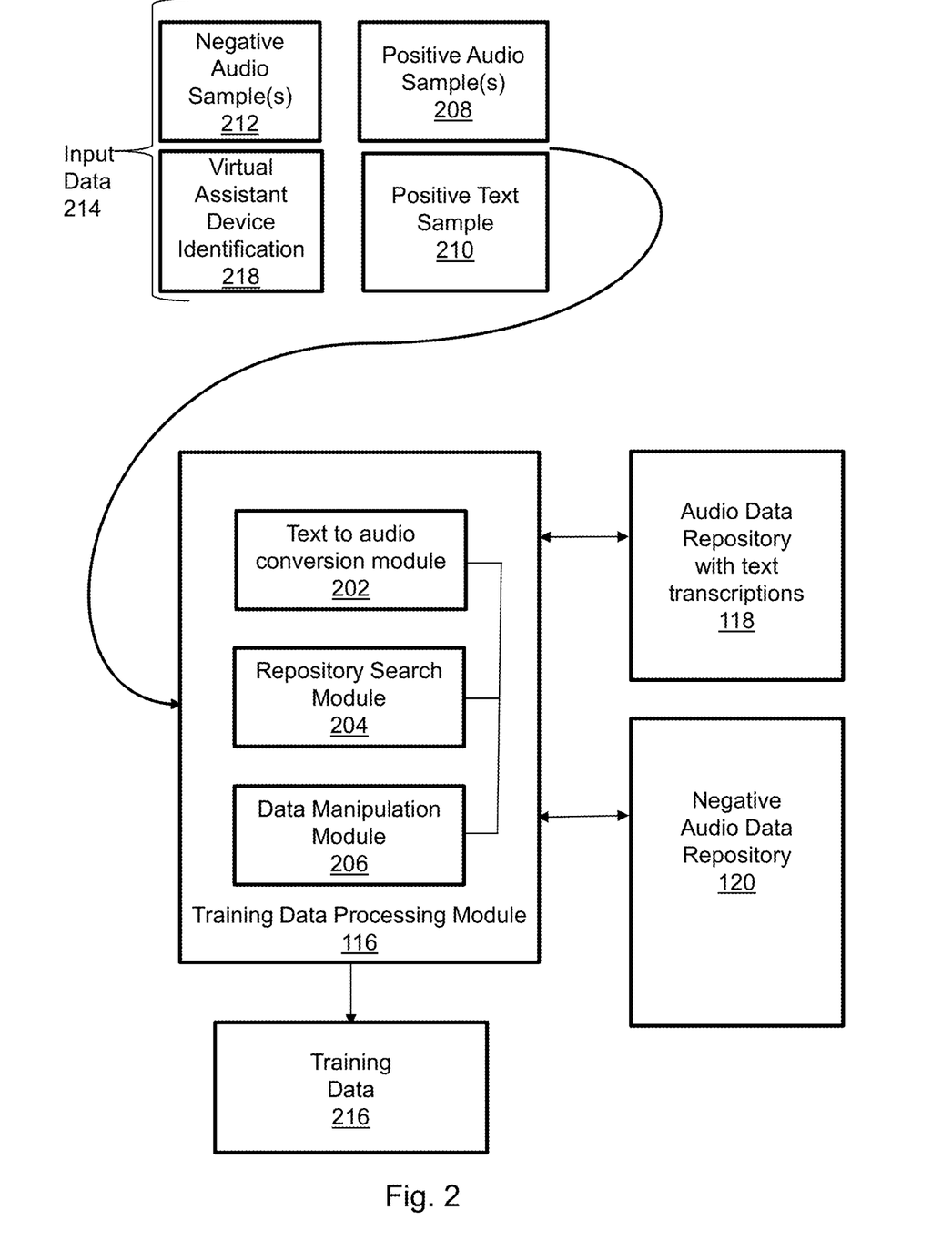
FIG. 2 is a block diagram illustrating example computer components of a training data processing module of FIG. 1B for generating training data, in accordance with one embodiment.

Referring to FIGS. 1A, 1B and 2, the computing device 102 may store data/information to storage devices 130, which may comprise, for example, input data (e.g. 214 see FIG. 2) providing particulars of custom wake phrase (e.g. a positive sample audio 208 of the custom wake phrase), output training data (e.g. 216 in FIG. 2) generated by the training data processing module, machine learning trained processes, audio data repository with transcriptions (e.g. storing a mapping of audio data to transcriptions) used to label input data and negative audio data repository (e.g. containing samples of negative data) used to generate the training data 216 to train a model for generating a phrase spotter executable by module 114 for computing device 108. Some of the functionality is described further herein below. The one or more storage devices 130 may store instructions and/or data for processing during operation of computing device 102. The one or more storage devices 130 may take different forms and/or configurations, for example, as short-term memory or long-term memory. Storage devices 130 may be configured for short-term storage of information as volatile memory, which does not retain stored contents when power is removed. Volatile memory examples include random access memory (RAM), dynamic random access memory (DRAM), static random access memory (SRAM), etc. Storage devices 130, in some examples, also include one or more computer-readable storage media, for example, to store larger amounts of information than volatile memory and/or store such information for long-term, retaining information when power is removed. Non-volatile memory examples include magnetic hard discs, optical discs, floppy discs, flash memories, or forms of electrically programmable memory (EPROM) or electrically erasable and programmable (EEPROM) memory.

Referring again to FIGS. 1A, 1B and 2, upon receiving the request 107 at the computing device 102, computing device 102 is configured to provide display of a developer interface on the requesting computing device 106 for collecting particulars of the custom wake phrase (e.g. input data 214). The input data 214 is in the form of one or more of input positive audio samples 208. Additionally, the input data 214 can comprise one or more of: input positive text sample 210, and input negative audio sample 212. The input data 214 is received and processed at the training data processing module 116 in communication with data repositories 118 and 120 to generate a training data 216 for subsequent use in training a computerized model for a phrase spotter executable as generated by the module 114.

The training data processing module 116 is generally configured to generate a set of positive and/or negative audio samples as training data 216 for subsequent training of a machine learning model (see FIG. 3) and generating an executable for spotting the custom wake phrase on a particular virtual assistant device (e.g. 108). The training data processing module 116 comprises a text to audio conversion module 202, a repository search module 204 (for searching within associated repositories 118 and 120) and a data manipulation module 206 for facilitating in generating the positive and negative samples in the training data 216. Generally, any audio that contains the exact phrase of the custom wake phrase is considered a positive sample (e.g. 208, 210).

Each of the computing devices described herein (e.g. 102, 106, 108) may comprise a processor and non-transitory computer readable medium. The computer readable medium may store computer program code that is executable by each of the device's processor and that, when executed by the processor, causes each of the computing devices (e.g. 102, 106, and 108) to perform the functionality attributed to them therein.

Example embodiments depicting example input data 214 scenarios and processing of such input data 214 to generate the training data 216 is described below with reference to FIG. 2. The embodiments below may also be combined such that various combination of input data 214 may be envisaged for improving accuracy of the training data 216.

Example 1—Input Data Comprising Input Positive Audio Sample 208

In one embodiment, the training data processing module 116 is configured to receive input data 214 comprising input positive audio sample 208 data corresponding to audio of a person speaking the custom wake phrase (e.g. a person saying "Hey, Mercedes" or "Hey, Pandora") from the requesting computing device 106. Such input positive audio sample 208 may be provided via a developer interface of the requesting computing device 106 (e.g. by uploading a pre-existing audio file or by speaking into a microphone of the requesting computing device 106 and recording an input positive sample). In this embodiment, the input positive audio sample 208 is output as training data 216 for training of the model (see FIG. 3).

Example 2—Input Data Comprising Input Positive Text Sample 210

In another embodiment, the training data processing module 116 is further configured to receive input data 214 comprising input positive text sample 210 corresponding to a text representation or transcription of the custom wake phrase (e.g. text="Hey Mercedes" or "Hey Pandora"). The input positive text sample 210 may be obtained by developer input (e.g. keyboard input via an interface for custom wake phrase data collection) or previously stored on the computing device 106 and/or uploaded onto the computing device 106. The training data processing module 116 is then configured to process the text to generate a corresponding stored positive audio sample signal. In one aspect, this includes searching, via the repository search module 204, within the audio data repository with text transcriptions 118 to determine a stored positive audio sample corresponding to the text provided in the sample 210 and provide that as training data 216. Alternatively, generating audio from the input positive text sample 210 comprises using the text to audio conversion module 202, which applies text-to-speech conversion (TTS) to generate an audio signal of the custom wake phrase and output as training data 216. In yet another aspect both the output from the text to audio conversion module 202 and the output from the repository search module 204 providing a mapping of the text to audio via the audio data repository 118 is included as training data 216 for the training of the computerized model in FIG. 3. Notably, the audio data repository 118 contains a collection of audio data labelled or associated with text transcriptions and can be augmented to include additional audio data as the developer provides further input positive audio samples 208 and/or input positive text samples 210.

Example 3—Input Data Comprising Input Negative Audio Sample 212

In yet another embodiment, the training data processing module 116 is configured to receive, from the requesting computing device 106, the input data 214 comprising input negative audio sample 212 data corresponding to audio sounding similar to a person speaking the custom wake phrase (e.g. a person saying "OK Alexandra" instead of "OK Alexa"; or "Hey Doodle" instead of "Hey Google") from the requesting computing device 106. This input negative audio sample 212 being phonetically (as represented by phonemes) and/or acoustically (as represented by a time sequence of samples or a spectrogram) similar to the input positive audio sample 208 but an incorrect representation of the custom wake phrase is considered to be a "bait" phrase and output as a negative sample in the training data 216. The bait data in the training data 216 is used to train the computerized model to differentiate bait phrases from actual spoken instances of the custom wake phrase. Such input negative audio sample 208, including bait samples, may be provided via an interface of the requesting computing device 106 (e.g. by uploading a pre-existing audio file or by speaking into a microphone of the requesting computing device 106 and recording an input negative sample).

Example 4—Training Data Comprising Stored Negative Audio Sample

In yet another embodiment, in addition to using the input positive audio sample 208 as training data 216, the training data processing module 116 uses the input positive audio sample 208 to search, via the repository search module 204, repositories (e.g. 118 and 120) for a stored negative audio sample having audible similarities to the sample 208 but an incorrect representation of the custom wake phrase. The stored negative audio sample is then provided as training data 216.

Example 5—Training Data Comprising Stored Negative Audio Sample Generated from Input Text Sample 210

In yet another embodiment, in addition to using the input positive audio sample 208 as training data 216, the input positive text sample 210 is used to retrieve a stored negative audio sample. Specifically, the input positive text sample 210 provided to the processing module 116 is used by the repository search module 204 to search within the audio data repository 118 for a stored negative audio sample having a transcription that is different but phonetically and/or acoustically similar to the text sample 210 representing the custom wake phrase. In this embodiment, the stored negative audio sample is then provided as training data 216 (e.g. as an example of an incorrect representation of the custom wake phrase).

Example 6—Training Data Comprising Stored Negative Audio Sample Generated from Negative Audio Data Repository In yet another embodiment, in addition to using the input positive audio sample 208 as training data 216, the repository search module 204 searches negative audio data repository 120 for a stored negative audio sample representative of non-speech audio. The data repository 120 contains for example: non-speech audio of typical environmental noise, and a collection of speech independent negative audio sample such as music.

Example 7—Input Data Comprising Virtual Assistant Device Identification 218

In at least some embodiments and referring to FIGS. 1A, 1B, 2 and 3, the requests 107 relate to multiple different virtual assistant computing devices 108. Accordingly, each of the virtual assistant computing devices 108 is provided, via the computing device 102, with a corresponding custom phrase spotter executable 308 such as to respectively recognize custom wake phrases intended for a particular device 108. Accordingly, the input data 214 provided subsequent to the request 107, further comprises virtual assistant device identification 218 which uniquely identifies each of the different virtual assistant computing devices 108 in the environment 100. Accordingly, once the phrase spotter executable 308 is generated, it is linked by the phrase spotter generation module 114 with the particular device 108 via the identification 218. Additionally, in some aspects, in the case of multiple different computing devices 108, the training data processing module 116 is configured to access, via the repository search module 204, negative audio samples within repository 120 that is specific to the particular device 108 (e.g. its environment, type of background sounds expected . . . ). For example, if the identification 218 identifies device 108 as being within a car, then the data manipulation module 206 augments the training data 216 with non-speech audio of typical environmental noise of a car as stored in the repository 120.

Figure 3:
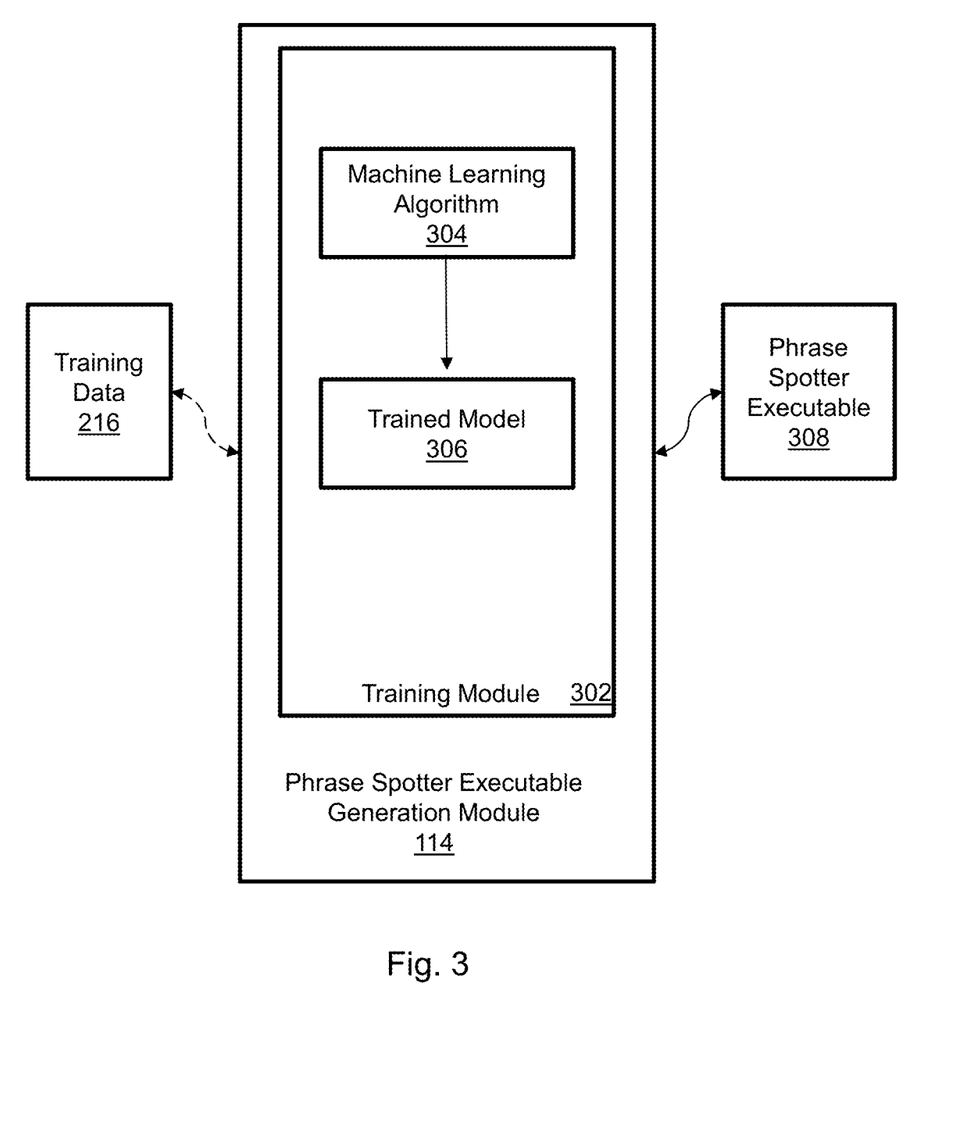
FIG. 3 is a block diagram illustrating example computer components of a phrase spotter executable generation module of FIG. 1B, in accordance with one embodiment.

In the example illustrated in FIG. 2 and FIG. 3, the positive and negative audio samples processed by the training data processing module 116 can further be augmented by adding sound effects such as white noise, babble noise, radio/car noise to the audio samples and providing as training data 216 such as to improve the accuracy of the trained model 306 and diversify the types of audio data that a phrase spotter executable 308 can discriminate.

Referring to FIGS. 2 and 3, subsequent to generating the training data 216 by the various positive and/or negative audio samples (including bait samples), the processor 122 of the computing device 102 co-ordinates for the training data 216 to be input into the phrase spotter executable generation module 114. The phrase spotter executable generation module 114 is configured to perform training via the training module 302 and generate a phrase spotter executable 308 that can run on a virtual assistant computing device (e.g. 108) for detecting custom wake phrase to "wake up" the device 108.

Training module 302 in FIG. 3 uses the training data 216 and generates a trained model 306 for use by the phrase spotter executable generation module 114 to generate the phrase spotter executable 308. Training module 302 receives training data 216 as input to machine learning algorithm 304. Training data 216 is a collection of positive audio samples (indicating correct audio representations of the custom wake phrase) and negative audio sample (indicating incorrect representations of the custom wake phrase). Machine learning algorithm 304 can be a regression or a classification method. The machine learning algorithm 304 utilizes the positive and/or negative sample sets and generates an optimal trained model 306. The trained model 306 provides functionality that recognizes positive audio samples in the training data 216 as the custom wake phrase and disregards negative audio samples in the training data 216 as not matching the custom wake phrase. The trained model 306 is then used by the processor 122 to generate the phrase spotter executable 308 to be deployed locally on the virtual assistant computing device 108 (or alternatively as part of a software development kit (SDK) platform, which is a collection of software used for developing applications for a specific device or operating system.)

In an alternative embodiment of FIG. 3, subsequent to the deploying of the phrase spotter executable 308, the computing device 102 may receive feedback from a developer of the requesting computing device 106, indicative of the model for the wake phrase spotter executable 308 recognizing incorrect audio samples as the custom wake phrase. In response to this feedback, the processor 122 is configured to include the incorrect audio sample as a negative sample in the training data 216 and dynamically re-train the model 306 to generate a new trained process and new phrase spotter executable for subsequent deployment.

Referring again to FIGS. 1A, 1B-3, in the examples illustrated, a developer interface such as a web interface is provided on the requesting computing device 106 in response to the request 107 for uploading positive and/or negative audio sample data (likely a .zip file of .wav or .mp3 files) and downloading a phrase spotter executable (e.g. 308 in FIG. 3) onto a requesting computing device 106 and/or virtual assistant computing device 108, in one embodiment. In an alternate embodiment (not illustrated), in response to the request 107, a software development kit (SDK) is provided to the requesting computing device 106 (e.g. containing one or more of the training data processing module 116, phrase spotter executable generation module 114, audio data repository with transcriptions 118, negative audio data repository 120) to allow developers to run the training process provided in the training module 302 of FIG. 3 independently on their desired computing device (e.g. 106).

Figure 4:
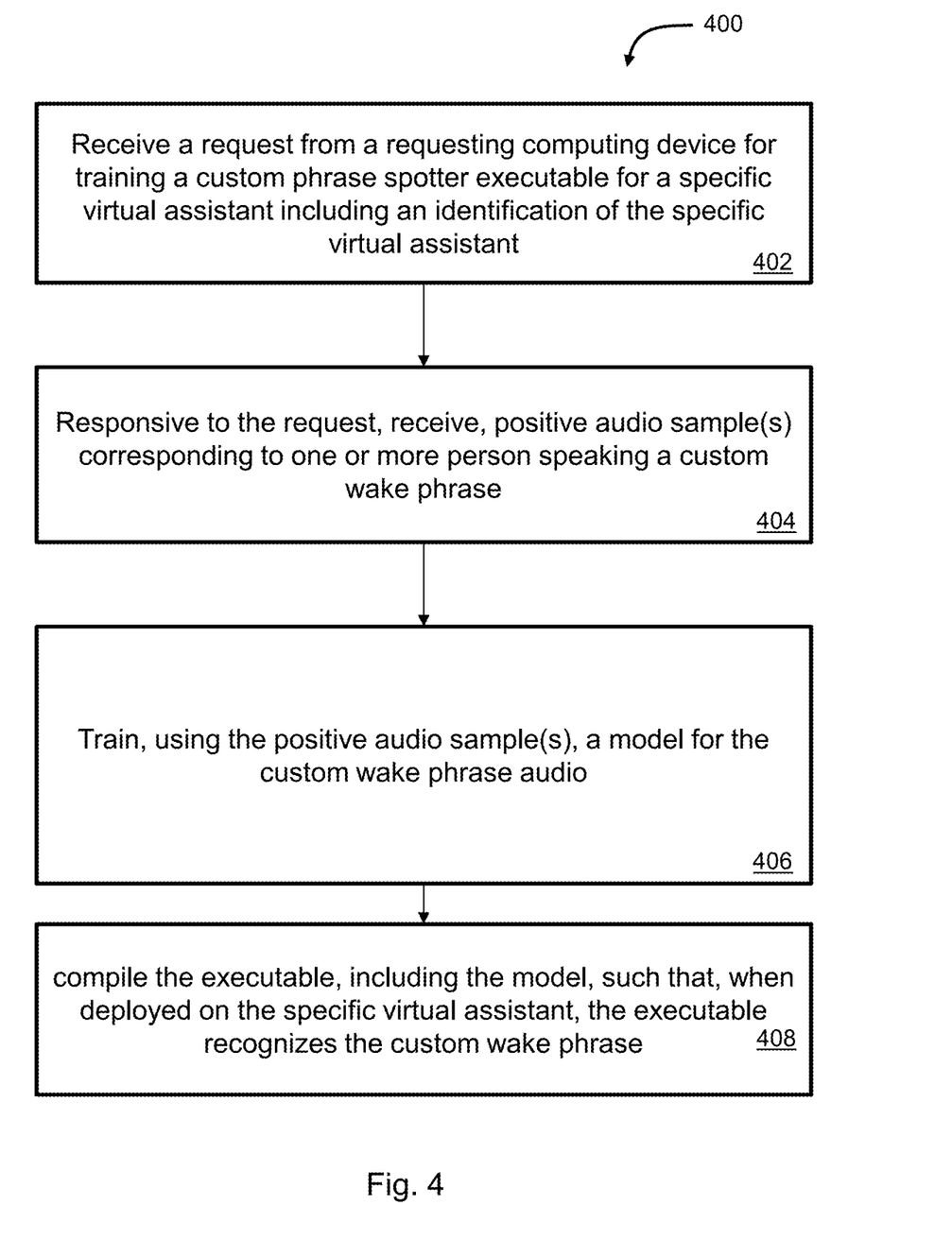
FIG. 4 is a flowchart of an exemplary process for dynamically training a computerized model (e.g. a computerized machine learning model) for an executable for spotting a custom wake phrase, in accordance with one embodiment; and, FIGS. 5A-5C are schematic diagrams illustrating example functionality of neural-network based wake phrase detectors 500, 510, 520 provided by the phrase spotter executable 308 of FIG. 3, in accordance with one or more embodiments.

FIG. 4 is a flowchart illustrating example operations 400 of the computing device 102 of FIGS. 1A, 1B-3, in accordance with an aspect of the present disclosure. Operations 400 receive a developer-defined custom wake phrase for awakening a specific voice controlled virtual assistant device and train a model of a custom wake phrase to spot the custom wake phrase in an audio signal. Notably, in at least some embodiments, the computing environment 100 of FIG. 1A comprises a plurality of different virtual assistant computing devices 108, each requiring a unique custom phrase spotter executable 308 for recognizing a particular custom wake phrase as selected by a developer (e.g., via a developer interface of the requesting computing device 106).

At 402, computing device 102 receives a request from a requesting computing device (e.g. 106) for training a custom phrase spotter executable for spotting a custom wake phrase. At step 404, responsive to the request, receive at a developer interface wake phrase customization particulars (e.g. input data 214) for training a model 306 using a machine learning algorithm 304. The input data 214 comprises identification data 218 for identifying a specific virtual assistant device 108 for deploying the custom phrase spotter executable 308 thereon. At step 404, the particulars (input data 214) further comprise at least one positive audio sample corresponding to at least one person speaking the custom wake phrase. The input positive audio sample may be a sound recording or characters uploaded and provided to the computing device 102. In some cases, the computing device 102 may further process the received customization particulars (e.g. providing positive and/or negative text and/or audio data samples of the custom wake phrase) to generate positive and/or negative training data for training module 302. Such processing may include for example, manipulating the positive sample(s) with environmental sounds or noise characteristics associated with the specific virtual assistant device 108. Some particulars (e.g. input data 214) may not need any transformation.

At 406, training of the model for the custom wake phrase audio is performed using the positive audio sample(s) (e.g. 208), and if applicable, other positive and/or negative audio/text samples in the input data 214. The trained model is for generating the phrase spotter executable 308 that, when deployed on a specific virtual assistant computing device (e.g. 108), recognizes subsequent audio input instances of the custom wake phrase based upon the training. Preferably, at step 408, the phrase spotter executable (e.g. 308 in FIG. 3) is then sent to the requesting computing device 106.

Figure 5A:
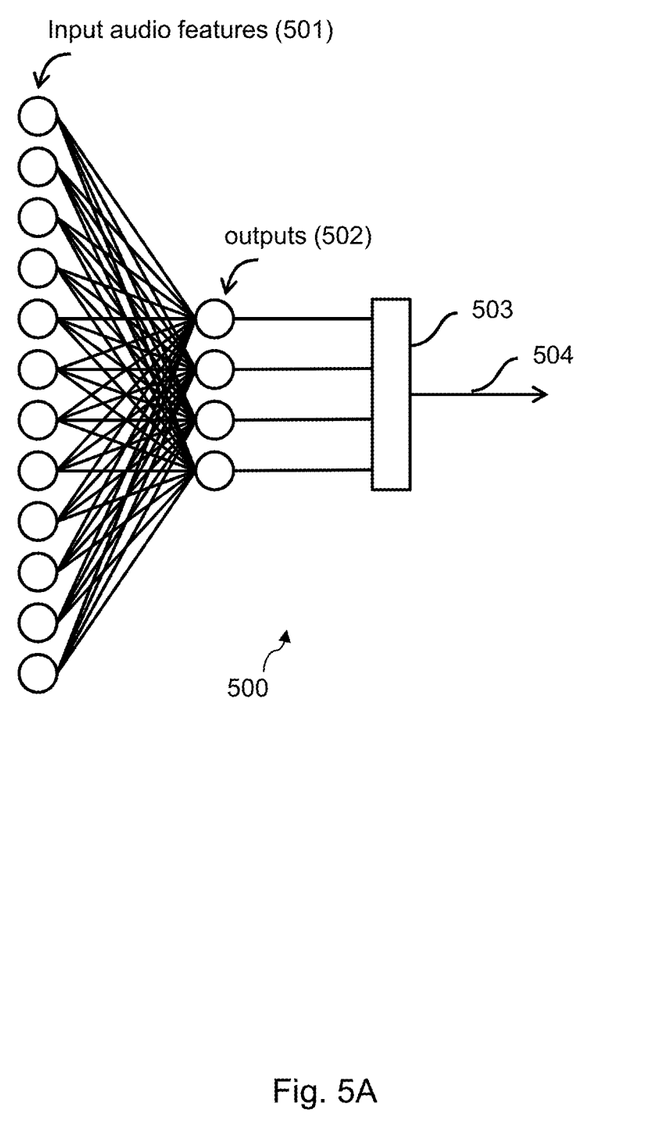
Figure 5B:
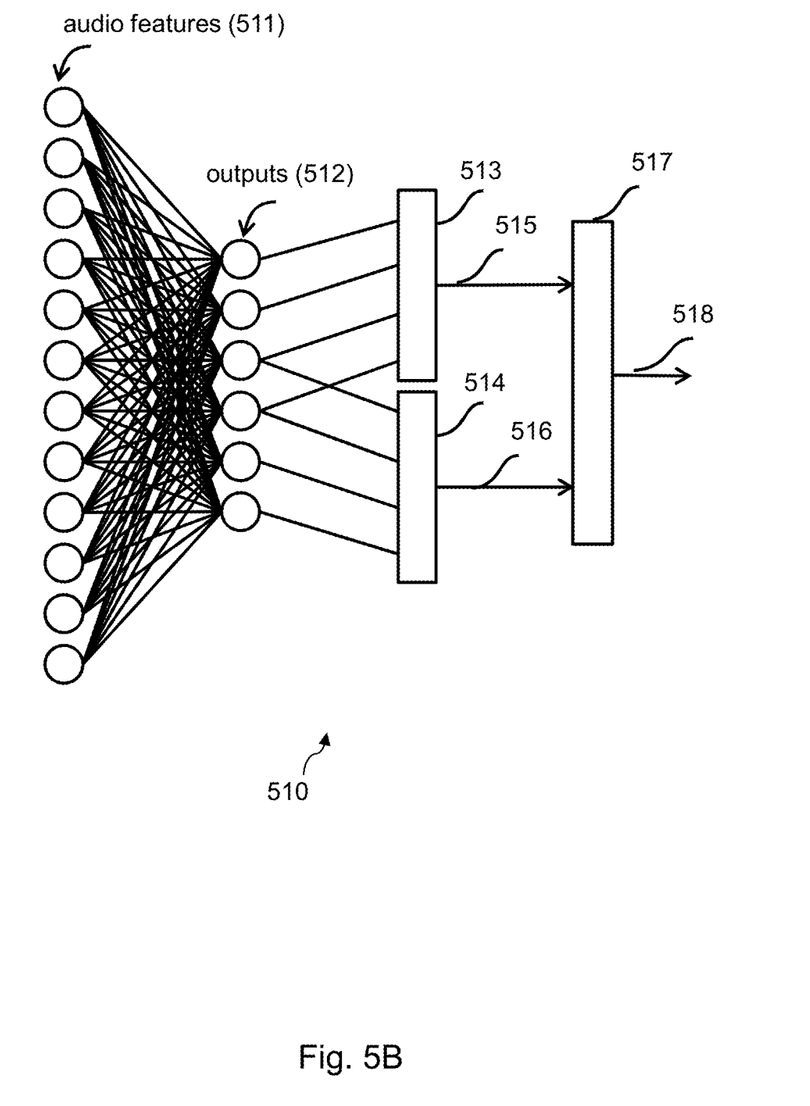
Figure 5C:
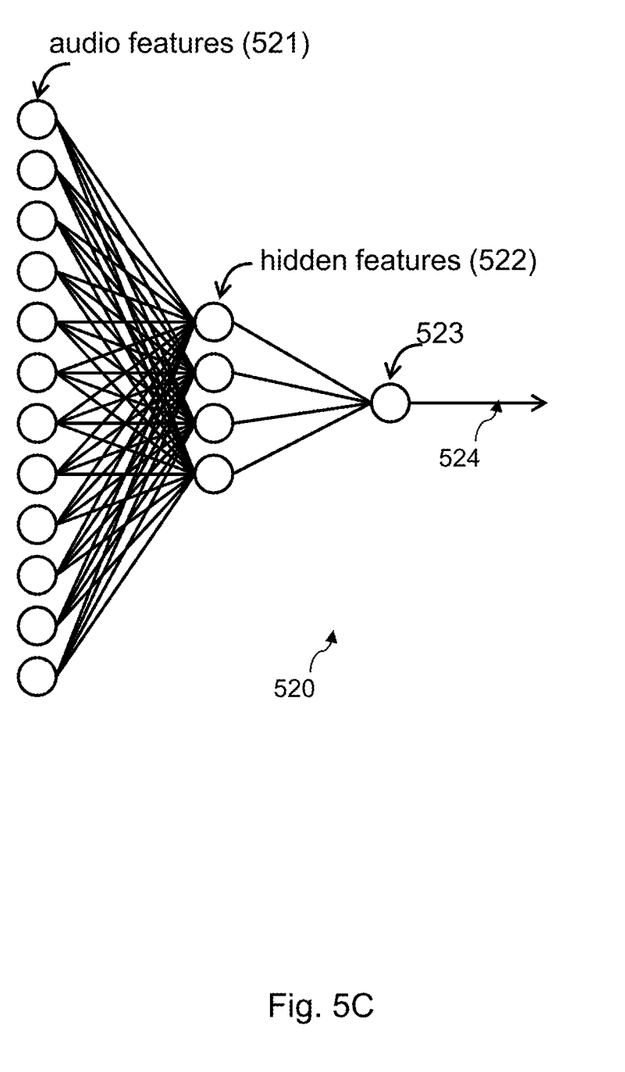

Referring now to FIGS. 5A-5C, shown are schematic diagrams illustrating example functionality of wake phrase detectors 500, 510, 520 provided by the phrase spotter executable 308 of FIG. 3, which can simultaneously detect one or more custom wake phrases to "wake up" the device 108 of FIG. 1A, in accordance with one or more embodiments.

FIG. 5A shows a neural network based wake phrase detector 500 that recognizes a single custom wake phrase. FIGS. 5B and 5C show neural network based wake phrase detectors 510 and 520 respectively, configured to listen for and recognize multiple wake phrases such that the same model is triggered to indicate a positive detection with any one of the multiple wake phrases (e.g. "Hey Hound" and "Hi Hound").

Referring now to FIG. 5A, shown is a single wake phrase detector 500 with a neural network for detecting a single custom wake phrase. The detector 500 comprises a set of input audio features 501 and a set of outputs 502 that are the most likely sub phrase units or partial-phrase units to have been spoken in a recent sequence of speech. Sub phrase units can be phonemes or sequences of multiple phonemes, including words of multi-word wake phrases. Additionally, the sub phrase units may be a unit smaller than a phoneme, such as a senone, or a unit larger than a phoneme such as a di-phone or tri-phone or multiple phonemes. In one aspect, the neural network depicted in FIG. 5A may have one or more hidden layers between the input nodes 501 and output nodes 502. Preferably, the detector 500 comprises a recurrent neural network, such as a long short-term memory (LSTM) neural network for recognizing a time-varying sequence. The single wake phrase detector 500 further comprises a matching block 503 that identifies when the sequence of sub phrase units provided at output 502 matches a pre-defined sequence for the wake phrase and provides an indication 504 of whether a match exists (e.g. the single custom wake phrase has been detected).

Referring to FIG. 5B, shown is a multiple wake phrase detector 510 comprising a neural network similar to the neural network-based wake phrase detector of FIG. 5A but configured to recognize two wake phrases. The detector 510 comprises a set of input audio features 511 and a set of outputs 512 that are the most likely sub phrase units to have been spoken in a recent sequence of sub phrase units for each of the two wake phrases. A first matching block 513 identifies when the sequence of sub phrase units matches the sequence for the first wake phrase and provides a first indication 515 of whether a match exists. A second matching block 514 identifies when the sequence of sub phrase units matches the sequence for the second wake phrase and provides a second indication 516 of whether a match exists for the second wake phrase. The first and second matching blocks 513 and 514 share some but also have some unique sub phrase units as input. Thus, the matching blocks 513 and 514 are configured to support, for example, two wake phrases having some overlapping sub phrase units such as "hey hound" and "okay hound", which have some common sub phrase units (e.g., "hound"). The detector 510 further comprises a decision block 517 which performs a logical OR operation to determine whether either of the first indication 515 OR the second indication 516 indicate a positive match, and output a final indication 518 indicative of whether the positive match exists for at least one of the two wake phrases. The positive match 518 for indicating to the associated virtual assistant device 108 to "wake up" and respond to subsequent spoken requests.

Referring to FIG. 5C shown is a fully neural-network based wake phrase detector 520 for spotting any number of spoken wake phrases. The detector 520 comprises a set of input audio features 521, a hidden layer of features 522, and a final output node 523 that indicates when the phrase detector 520 has recognized any one of the number of spoken wake phrases and provides an indication of recognition as output 524. Preferably the neural network of FIG. 5C is recurrent to capture the time-varying nature of speech audio for a wake phrase. In some aspects, the hidden layer might not be necessary, but might represent features analogous to sub phrase units. Such a neural network depicted in FIG. 5C can be trained for any number of wake phrases by using a training data set of positive examples of each desired wake phrase. This approach works for wake phrases that are similar and wake phrases that are very different such as ones that are meaningful in different human languages. For very large numbers of wake phrases, good accuracy would benefit from a somewhat larger number of hidden nodes or hidden layers shown as hidden features 522.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

The invention claimed is:

1. A computer-implemented method comprising:
supporting a plurality of virtual assistants;
receiving a request from a virtual assistant device, the request comprising wake phrase audio and an identification of a device type;
identifying, based on the identification of the device type, a specific environment for which the virtual assistance device is used;
retrieving, from a repository associated with the specific environment, typical non-speech environmental noise for the specific environment, wherein the typical non-speech environmental noise is used for augmenting positive audio samples and negative audio samples of the wake phrase audio;
based on the device type, retrieving a plurality of wake phrase detectors associated with the device type in a repository of wake phrase detectors for the plurality of virtual assistants;
identifying when the wake phrase audio triggers a wake phrase detector of the plurality of the wake phrase detectors; and
in response to the wake phrase audio triggering the wake phrase detector, providing a corresponding response to the virtual assistant device, wherein the wake phrase detector is trained from positive audio samples of the wake phrase and negative audio samples of the wake phrase audio, wherein the positive audio samples contain a match of the wake phrase audio and the negative audio samples contain similar phrases of the wake phrase audio.

2. The method of claim 1, wherein the wake phrase detector is a model represented by layers of a neural network.

3. The method of claim 1, further comprising storing the wake phrase audio in a corpus for training wake phrase detectors.

4. The method of claim 1, wherein the wake phrase detector is further configured to detect noise characteristics present in the wake phrase audio and associated with the device type and, based on the detection, providing the response.

5. The method of claim 1, wherein the wake phrase detector is trained from only positive audio samples of the wake phrase.

6. The method of claim 1, wherein the identification of the device type uniquely identifies the virtual assistant device with respect to the plurality of virtual assistants supported.

7. The method of claim 1, wherein the identification of the device type further identifies an associated computing device within which the virtual assistant device is deployed, the associated computing device being a car.

8. A non-transitory computer-readable medium containing computer program code that are executable by a processor supporting a plurality of virtual assistants for the processor to perform:
receiving a request from a virtual assistant device, the request comprising wake phrase audio and an identification of a device type;
identifying, based on the identification of the device type, a specific environment for which the virtual assistance device is used;
retrieving, from a repository associated with the specific environment, typical non-speech environmental noise for the specific environment, wherein the typical non-speech environmental noise is used for augmenting positive audio samples and negative audio samples of the wake phrase audio;
based on the device type, retrieving a plurality of wake phrase detectors associated with the device type in a repository of wake phrase detectors for the plurality of virtual assistants;
identifying when the wake phrase audio triggers a wake phrase detector of the plurality of the wake phrase detectors; and
in response to the wake phrase audio triggering the wake phrase detector, providing a corresponding response to the virtual assistant device,
wherein the wake phrase detector is trained from positive audio samples of the wake phrase and negative audio samples of the wake phrase audio, wherein the positive audio samples contain a match of the wake phrase audio and the negative audio samples contain similar phrases of the wake phrase audio.

9. The non-transitory computer-readable medium of claim 8, wherein the wake phrase detector is a model represented by layers of a neural network.

10. The non-transitory computer-readable medium of claim 8, wherein the processor is further configured to perform: storing the wake phrase audio in a corpus for training wake phrase detectors.

11. The non-transitory computer-readable medium of claim 8, wherein the processor is further configured to the identification of the device type uniquely identifies the virtual assistant device with respect to the plurality of virtual assistants supported.

12. The non-transitory computer-readable medium of claim 8, wherein the device type further identifies an associated computing device within which the virtual assistant device is deployed, the associated computing device being a car.

* * * * *